US011874923B2

(12) United States Patent
Monnier

(10) Patent No.: US 11,874,923 B2
(45) Date of Patent: Jan. 16, 2024

(54) METHOD AND ELECTRONIC DEVICE FOR MONITORING AN AVIONICS SOFTWARE APPLICATION VIA SYSTEM CALL(S) COUNTERS, RELATED COMPUTER PROGRAM AND AVIONICS SYSTEM

(71) Applicant: THALES, Courbevoie (FR)

(72) Inventor: Stephane Jean-Mary Monnier, Merignac (FR)

(73) Assignee: THALES, Courvevoie (FR)

( * ) Notice: Subject to any disclaimer, the term of this patent is extended or adjusted under 35 U.S.C. 154(b) by 539 days.

(21) Appl. No.: 17/089,528

(22) Filed: Nov. 4, 2020

(65) Prior Publication Data
US 2021/0141901 A1 May 13, 2021

(30) Foreign Application Priority Data
Nov. 7, 2019 (FR) ..................... 19 12491

(51) Int. Cl.
*G06F 11/07* (2006.01)
*G06F 21/56* (2013.01)

(52) U.S. Cl.
CPC .......... *G06F 21/566* (2013.01); *G06F 11/076* (2013.01); *G06F 11/0739* (2013.01); *G06F 2221/033* (2013.01)

(58) Field of Classification Search
CPC .. G06F 21/566; G06F 11/0739; G06F 11/076; G06F 2221/033
See application file for complete search history.

(56) References Cited

U.S. PATENT DOCUMENTS 6,275,767 B1 * 8/2001 Delseny ................. G06Q 99/00
701/120
10,009,246 B1 * 6/2018 Benattar ................. H04L 43/04
(Continued)

FOREIGN PATENT DOCUMENTS

CN 110297648 A 10/2019
EP 3399720 A1 11/2018
(Continued)

OTHER PUBLICATIONS

Carelli, A., et al., "Performance Monitor Counters: Interplay Between Safety and Security in Complex Cyber-Physical Systems", IEEE Transactions on Device and Materials Reliability, XP011713517, vo. 19, pp. 73-83 (Mar. 1, 2019).
(Continued)

*Primary Examiner* — Matthew M Kim
*Assistant Examiner* — Indranil Chowdhury
(74) *Attorney, Agent, or Firm* — ArentFox Schiff LLP

(57) ABSTRACT

An electronic device for monitoring at least one avionics software application capable of being executed on a platform hosting an operating system offering services,
the electronic device comprising an acquisition module for acquiring respective values of first and second counters of calls sent by the monitored software application to one or more services of the operating system, the first counter being incremented upon each successful call, and the second counter being incremented upon each failed call,
a comparison module for comparing the respective values of the first and second counters with respective first and second thresholds, and
a generation module for generating a warning signal in the event of detection of abnormal behavior of the software application, corresponding to the first counter being
(Continued)

less than the first threshold during a predefined period and/or to the second counter being greater than the second threshold.

12 Claims, 3 Drawing Sheets

(56) References Cited

U.S. PATENT DOCUMENTS

| | | | | |
|---|---|---|---|---|
| 2002/0184568 | A1* | 12/2002 | Kurrasch | G06F 11/0793 |
| | | | | 714/39 |
| 2010/0275184 | A1* | 10/2010 | Nir | G06F 11/3688 |
| | | | | 717/125 |
| 2014/0106704 | A1* | 4/2014 | Cooke | H04W 4/16 |
| | | | | 455/405 |
| 2014/0136898 | A1* | 5/2014 | McKiou | H04L 41/0654 |
| | | | | 714/E11.021 |
| 2016/0328561 | A1* | 11/2016 | Tamir | G06F 21/552 |
| 2018/0173579 | A1* | 6/2018 | Potlapally | G06F 11/0793 |
| 2019/0107415 | A1* | 4/2019 | Fumey | G06F 11/3612 |
| 2020/0065175 | A1* | 2/2020 | Hoegberg | G06F 11/0739 |
| 2020/0174906 | A1* | 6/2020 | Renard | G06F 11/3013 |
| 2020/0241936 | A1* | 7/2020 | Milliron | G06F 9/542 |
| 2022/0066679 | A1* | 3/2022 | Hieb | G06F 11/076 |

FOREIGN PATENT DOCUMENTS

| | | | | |
|---|---|---|---|---|
| FR | 3065945 | A1 | 11/2018 | |
| WO | WO-2015162541 | A1 * | 10/2015 | G05B 23/02 |
| WO | WO-2018039226 | A1 * | 3/2018 | G06F 11/36 |
| WO | WO-2023046161 | A1 * | 3/2023 | |
| WO | WO-2023126512 | A1 * | 7/2023 | |

OTHER PUBLICATIONS

French Search report issued by the French Patent Office in corresponding French Application No. 1912491, dated Jul. 17, 2020.
Kadar, M., et al., "System Calls Instrumentation for Intrusion Detection in Embedded Mixed-Criticality Systems", 4th International Workshop on Security and Dependability of Critical Embedded Real-Time Systems (CERTS), Article No. 2, pp. 2:1-2:13 (2019).

* cited by examiner

METHOD AND ELECTRONIC DEVICE FOR MONITORING AN AVIONICS SOFTWARE APPLICATION VIA SYSTEM CALL(S) COUNTERS, RELATED COMPUTER PROGRAM AND AVIONICS SYSTEM

CROSS-REFERENCE TO RELATED APPLICATIONS

This application is a U.S. non-provisional application claiming the benefit of French Application No. 19 12491, filed on Nov. 7, 2019, which is incorporated herein by reference in its entirety.

FIELD

The present invention relates to an electronic device for monitoring an avionics software application capable of being executed on a platform hosting an operating system, the platform being intended to be carried on board an aircraft.

The invention also relates to an avionics system comprising a memory capable of storing at least one avionics software application; a platform capable of running each avionics software application, the platform hosting an operating system; and such an electronic device for monitoring each avionics software application.

The invention relates to a method for monitoring an avionics software application capable of being executed on a platform hosting an operating system, the platform being intended to be carried on board an aircraft, the method being implemented by an operating system by such an electronic monitoring device.

The invention also relates to a non-transitory computer-readable medium including a computer program comprising software instructions which, when executed by a computer, implement such a monitoring method.

The invention relates to the field of cyber security and operational safety of on-board avionics platforms, in particular the monitoring of software applications executed on such on-board avionics platforms.

BACKGROUND

Document FR 3 065 945 A1 discloses a method and an electronic device for monitoring an avionics software application capable of being executed on a platform comprising resources and hosting an operating system, the platform being intended to be carried on board an aircraft. This monitoring is carried out via the implementation of at least one monitoring operation among a syntactic monitoring of each call sent by the application to the operating system, a semantic monitoring of each call sent by the application to the system operating system, monitoring a dynamic of calls sent by the application to the operating system, and monitoring the use by the application of platform resources. This monitoring then includes the generation of a warning signal in the event of detection of abnormal behavior of the application during the implementation of at least one of said monitors.

However, such monitoring is relatively complex.

We know from the document "*System calls instrumentation for intrusion detection in embedded mixed-criticality systems*" by Kadar et al, 4th International Workshop on Security and Dependability of Critical Embedded Real-Time Systems (CERTS 2019), a method for monitoring calls to the system operating system call using a system call tracer, integrated into the operating system kernel. Such tracing then makes it possible to detect an intrusion inside the on-board system that is the object of this monitoring.

However, such tracing of system calls is relatively complex and also has an impact on real-time operations, this tracing leading to additional delays, as discussed in this document.

SUMMARY

The object of the invention is, therefore, to provide an electronic device and a method for monitoring an avionics software application capable of being executed on an avionics platform, which make it possible to more effectively detect an attack targeting the software application or abnormal behavior of the software application.

To this end, the invention relates to an electronic device for monitoring an avionics software application capable of being executed on a platform hosting an operating system offering services, the platform being intended to be carried on board an aircraft, the electronic monitoring device comprising:

an acquisition module configured to acquire respective values of first and second counters for each monitored software application, the first and second counters each being a counter of calls sent by the monitored software application to one or more services of the operating system, the first counter being incremented upon each successful call to a respective service and the second counter being incremented on each failed call;

a comparison module configured to compare the respective values of the first and second counters, acquired for each software application monitored, with respective first and second thresholds; and a generation module configured to generate a warning signal in the event of detection of abnormal behavior of the monitored software application, corresponding to the first counter with a value less than the first threshold during a predefined period of time and/or to the second counter with a value greater than the second threshold.

Thus, with the electronic monitoring device according to the invention, the acquisition of the respective values of the first and second counters, then their comparison with the respective first and second thresholds makes it possible to simply check whether each monitored software application is still alive, i.e. operational, and generate a warning signal in the event of detection of abnormal behavior of the monitored application.

In addition, the implementation of this monitoring is simple, and the impact on real-time is then limited, since a single counter is updated for each system call of a software application, each counter being, in addition, directly implemented by the operating system.

Thus, the monitoring of software applications is limited to monitoring the evolution of the first and second counters for each application, and the simplicity of this mechanism then allows monitoring without degradation of the performance of the avionics system.

According to other advantageous aspects of the invention, the monitoring device comprises one or more of the following characteristics, taken in isolation or in any technically feasible combination:

the first counter comprises a set of first elementary counters, each first elementary counter being associated with a type of call sent by the monitored software application to the operating system, a single first elementary counter of said set being incremented upon each successful call, and the acquisition module is configured to acquire the respective value of each of the first elementary counters of said set; the comparison module is configured to compare the respective values of the first elementary counters with respective first elementary thresholds; and the generation module is configured to generate the warning signal in the event of detection of abnormal behavior of the monitored software application, corresponding to at least one of the first elementary counters with a value lower than the first respective elementary threshold during the predefined time period;

each type of call is chosen from among the group consisting of: a call to an input/output acquisition service, a call to a process management service, a call to a management of communication protocols and management of a timer, in particular its triggering;

the second counter comprises a set of second elementary counters, each second elementary counter being associated with a type of failure, a single second elementary counter of said set being incremented upon each failed call, and the acquisition module is configured to acquire the respective value of each of the second elementary counters of said set; the comparison module is configured to compare the respective values of the second elementary counters with respective second elementary thresholds; and the generation module is configured to generate the warning signal in the event of detection of abnormal behavior of the monitored software application, corresponding to at least one of the second elementary counters with a value greater than the respective second elementary threshold;

each type of failure is chosen from among the group consisting of: a failure resulting from an incorrect call format, a failure resulting from a hardware problem, a failure resulting from a service call causing an unauthorized memory access and a failure resulting from an unauthorized service call;

the acquisition module is configured to regularly acquire the respective values of the first and second counters for each monitored software application, the acquisition module being preferably configured to acquire at a predefined acquisition frequency said respective values of the first and second counters, the predefined acquisition frequency being preferably greater than 2 Hz, more preferably still, substantially between 10 Hz and 20 Hz; and the predefined time period has a value substantially between 100 ms and 500 ms, preferably substantially equal to 200 ms.

The object of the invention is also an avionics system comprising:

a memory capable of storing at least one avionics software application;

a platform capable of running each avionics software application, the platform hosting an operating system offering services; and an electronic monitoring device for each avionics software application, the electronic monitoring device being as defined above.

Another object of the invention is a method for monitoring an avionics software application capable of being executed on a platform hosting an operating system offering services, the platform being configured to be carried on board an aircraft, the method being implemented by an electronic monitoring device and comprising the steps of:

acquire respective values of first and second counters for each monitored software application, the first and second counters each being a counter of calls sent by the monitored software application to one or more services of the operating system, the first counter being incremented upon each successful call to a respective service and the second counter being incremented upon each failed call;

compare the respective values of the first and second counters, acquired for each monitored software application, with respective first and second thresholds; and generate a warning signal in the event of detection of abnormal behavior of the monitored software application, corresponding to the first counter with a value lower than the first threshold during a predefined period of time and/or to the second counter with a higher value than the second threshold.

Another object of the invention is a non-transitory computer-readable medium including a computer program comprising software instructions which, when executed by a computer, implements a monitoring method, as defined above.

BRIEF DESCRIPTION OF THE DRAWINGS

These features and advantages of the invention will emerge more clearly upon reading the description which follows, given solely by way of non-limiting example, and made with reference to the accompanying figures, in which.

DETAILED DESCRIPTION

In the remainder of the description, the expression "substantially equal to" defines a relationship of equality at plus or minus 10%, more preferably at plus or minus 5%.

Figure 1:
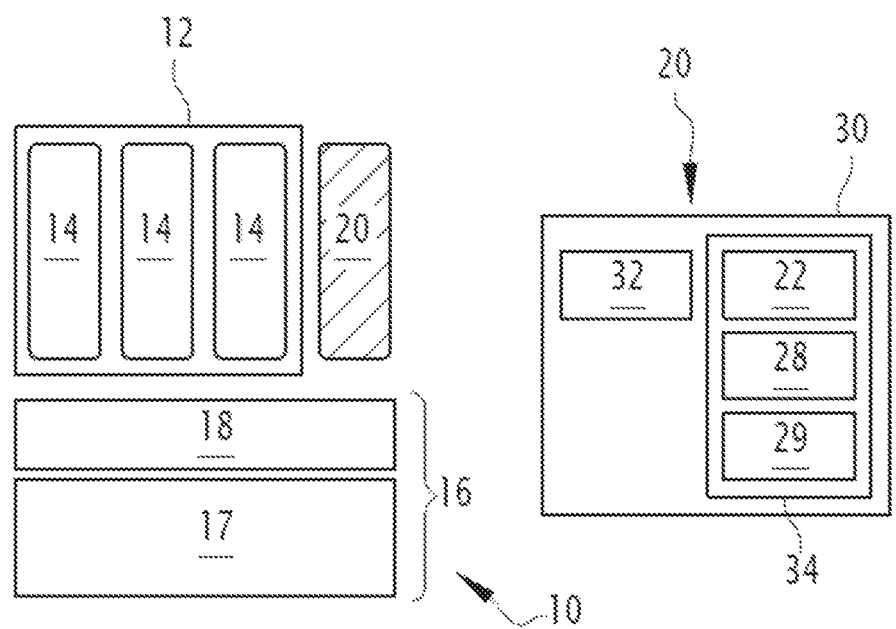
FIG. 1 is a schematic representation of an avionics system according to the invention, comprising a memory capable of storing at least one avionics software application; a platform capable of executing each avionics software application, the platform comprising resources and hosting an operating system; and an electronic device for monitoring each avionics software application.

In FIG. 1, an avionics system 10, intended to be carried on board an aircraft, comprises a memory 12 capable of storing at least one avionics software application 14; a platform 16 capable of executing each avionics software application 14, the platform 16 comprising resources 17 and hosting an operating system 18.

The avionics system 10 further comprises, according to the invention, an electronic device 20 for monitoring each avionics software application 14.

The aircraft is preferably an airplane. Alternatively, the aircraft may be a helicopter, or even a drone piloted remotely by a pilot.

Figure 2:
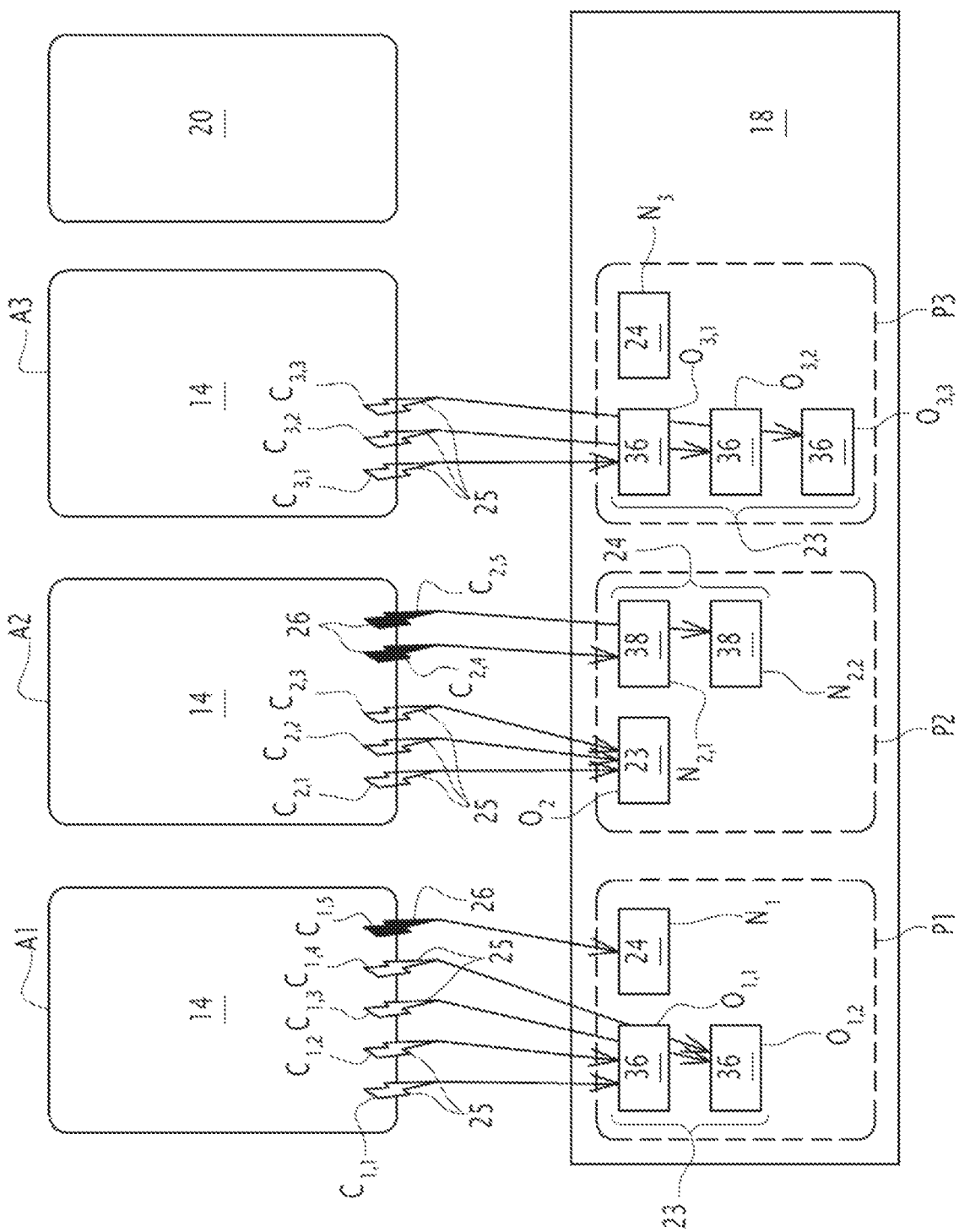
FIG. 2 is a schematic representation illustrating calls sent by several monitored software applications to different services of the operating system, with the incrementing of a respective first counter for each monitored application upon each successful call of said application and the incrementing of a second counter for each monitored application upon each failed call to said application.

In the example of FIGS. 1 and 2, the memory 12 is able to store three distinct avionics software applications 14, and the electronic monitoring device 20 is then configured to monitor each of these avionics software applications 14.

Each avionics software application 14 is intended to be executed by the platform 16 and then to send one or more calls to the operating system 18 hosted by the platform 16 and to use resources 17 of the platform 16.

Each avionics software application 14 is also called an avionics function. The avionics software applications 14 perform different functions for the accomplishment of a flight, and are, for example, installed on different platforms 16 and use the resources 17 of said platforms 16.

Since such functions are critical, such as, for example, the braking system or the flight management system, each avionics software application 14 is preferably regularly monitored by the electronic monitoring device 20, during substantially the entire time of execution of the avionics software application 14 via the platform 16.

The platform 16 is intended to be carried on board the aircraft. The platform 16 is, for example, an information processing unit formed by one or more memories associated with one or more processors.

The resources 17 of the platform 16 are physical or logical elements suitable for being made available to the avionics software application(s) 14. The resources 17 are, for example, divided into the following categories:
resources of the data processing type. Such resources are, for example, the computing power of a processor or the storage capacity of a memory.
input and output type resources.
resources specific to the avionics network. Such resources are, for example, the communication routers of an ARINC664 network, in particular ARINC664 Part 3 or ARINC664 Part 7.
resources of the graphic type, i.e. the resources allowing a display. A screen is an example of such resources.
mass memory type resources.

The operating system 18 is, for example, an operating system conforming to the ARINC 653 standard, or a POSIX operating system, or even a hypervisor, or even middleware.

The skilled person in the art will then understand that the operating system 18 is understood in the broad sense and is, more generally, a set of at least one basic software program, configured to offer services of different types to each application 14.

A service is, therefore, a function of the basic software that may be used by the application(s) 14 and may be reached by a call, also referred to as calling a service (of the OS) or even a system call. An example of basic software is an ARINC 653 or POSIX OS that provides such services. In the context of the invention, the skilled person in the art will understand that it is the notion of calling for a service that matters, and not the service as such, offered by the basic software.

The services offered by the operating system 18 are known per se, and are, for example, input/output acquisition, process management, communication protocol(s) management services, etc. The types of service are then the acquisition of inputs/outputs, process management, management of communication protocol(s) and management of a timer, in particular its triggering.

The skilled person in the art will note that the ARINC 653 and POSIX standards each comprise, for example, a list of services generally used in the aeronautical field. The skilled person in the art will however observe that the invention relates more generally to any basic software suitable for an avionics software application 14, insofar as the service(s) offered by this basic software, as well as the call(s) to service(s) sent by each avionics software application 14, are identifiable.

The electronic monitoring device 20 is configured to monitor each avionics software application 14 capable of being executed on the platform 16, and comprises a module 22 for acquiring the respective values of first 23 and second 24 counters for each monitored software application 14, the first 23 and second 24 counters each being a counter 25, 26 of calls sent by the monitored software application 14 to one or more services of the operating system 18, the first counter 23 being incremented upon each successful call 25 to a respective service and the second counter 24 being incremented upon each failed call 26.

The electronic monitoring device 20 also comprises a module 28 for comparing the respective values of the 23 and second 24 counters with the respective first S1 and second S2 thresholds, and a module 29 for generating a warning signal in the event of detection of abnormal behavior of the monitored software application 14, corresponding to the first counter 23 having a value lower than the first threshold S1 during a predefined time period T and/or to the second counter 24 having a value greater than the second threshold S2.

In the example of FIG. 1, the monitoring device 20 is, for example, separate from the platform 16, and comprises an information processing unit 30 in the form, for example, of a processor 32 associated with a memory 34.

As a variant, for which the monitoring device 20 is shown in hatched lines in FIG. 1, the monitoring device 20 is able to be executed directly by the platform 16 and then use its resources 17. This variant is a preferred embodiment, and the monitoring device 20 is then preferably further hosted within a specific memory partition of the platform 16, this specific partition itself being protected against cyber-attacks, for example, via one or more access security controls and/or integrity protection.

In the example of FIG. 1, whether the monitoring device 20 is separate from the platform 16, or is hosted and executed by the platform 16, the acquisition module 22, the comparison module 28 and the generation module 29 are each produced in the form of software, or a software brick, which may be executed by a processor, such as processor 32 when the monitoring device 20 is distinct from the platform 16. The memory 34 of the monitoring device 20 is then capable of storing software for acquiring the respective values of the first 23 and second 24 counters for each monitored software application 14, software for comparing the respective values of the 23 and second 24 counters with the respective first S1 and second S2 thresholds, and software for generating the warning signal in the event of detection of abnormal behavior of the monitored software application 14. The processor is then able to execute the acquisition software, the comparison software and the generation software.

In a variant not shown, the acquisition module 22, the comparison module 28 and the generation module 29 are each produced in the form of a programmable logic component, such as an FPGA (Field Programmable Gate Array), or in the form of a dedicated integrated circuit, such as an ASIC (Application Specific Integrated Circuit).

When the monitoring device 20 is produced in the form of one or more software programs, i.e. in the form of a computer program, it is also able to be recorded on a medium (not shown) that is readable by computer. The computer-readable medium may be, for example, a medium suitable for storing electronic instructions and capable of being coupled to a bus of a computer system. By way of example, the readable medium may be a floppy disk or flexible disk, an optical disk, a CD-ROM, a magneto-optical disk, a ROM memory, a RAM memory, any type of non-volatile memory (e.g. EPROM, EEPROM, FLASH, NVRAM), a magnetic card or an optical card. On the readable medium is then stored a computer program comprising software instructions.

The acquisition module 22 is configured to acquire the value of the first counter 23 and the value of the second counter 24 for each monitored software application 14, the first counter 23 being a successful counter 25 of calls to services of the operating system 18, sent by the monitored software application 14, and the second counter 24 is a counter 26 of failed calls to the operating system 18, sent by the monitored software application 14.

The acquisition module 22 is preferably configured to regularly acquire the respective values of the first 23 and second 24 counters for each monitored software application 14.

The acquisition module 22 is, for example, configured to acquire, at a predefined acquisition frequency, said respective values of the first and second counters 23, 24. The predefined acquisition frequency is preferably greater than 2 Hz, more preferably still, substantially between 10 Hz and 20 Hz. In other words, the period of time between two successive acquisitions is preferably less than 500 ms, the period of time between two successive acquisitions more preferably being substantially between 50 ms and 100 ms.

Each first counter 23 and each second counter 24 is preferably incremented by the operating system 18 itself. The operating system 18 comprises, for example, a plurality of partitions, denoted P1, P2, P3 in the example of FIG. 2, each software application 14 being associated with a respective partition P1, P2, P3. In the example of FIG. 2, a first software application 14, denoted A1, is associated with a first partition, denoted P1, a second software application 14, denoted A2, is associated with a second partition, denoted P2, and a third software application 14, denoted A3, is associated with a third partition, denoted P3. Each first counter 23 and each second counter 24 is then preferably associated with a respective partition P1, P2, P3. Each first counter 23 and each second counter 24 are implemented as soon as the corresponding software application 14 is launched, and are reset upon each new launch of the corresponding software application 14.

Each first counter 23 is incremented, preferably by one, upon each successful call 25 to a respective service of the operating system 18, and each second counter 24 is incremented, preferably by one, upon each failed call 26 to the operating system 18 by the respective monitored software application 14.

When the first counter 23 is incremented by one upon each successful call 25, the first threshold S1 is preferably equal to 1; and when the second counter 24 is incremented by one upon each failed call 26, the second threshold S2 is preferably equal to 0.

By successful call 25 is meant a correctly performed system call, the service of the operating system 18 required by the software application 14 then being rendered, or even offered.

By failed call 26, we mean a system call which was not correctly carried out and which failed before being terminated, for example following an incorrectly formatted request, or even a refused access request.

The comparison module 28 is configured to compare the respective values of the first and second counters 23, 24, acquired for each monitored software application 14, with respective first and second thresholds S1, S2. The first threshold S1 is, for example, equal to 1, given that each monitored software application 14 is intended to make at least one call to a respective service of the operating system 18. The second threshold S2 is, for example, equal to 0, in order to raise a warning as soon as a monitored software application 14 has resulted in a failed call 26 to the operating system 18.

The generation module 29 is then configured to generate the warning signal in the event of detection of abnormal behavior of the monitored software application 14, wherein this abnormal behavior corresponds either to a value of the respective first counter 23 below the first threshold S1 during the predefined time period T, or to a value of the second counter 24 greater than the second threshold S2, or else in both the two aforementioned cases.

The predefined time period T is, for example, of value substantially between 100 ms and 500 ms, preferably substantially equal to 200 ms.

As an optional addition, at least a first counter 23 comprises a set of first elementary counters 36, each first elementary counter 36 being associated with a type of call sent by the monitored software application 14 to the operating system 18, a single first elementary counter 36 of said set being incremented upon each successful call 25. The acquisition module 22 is then configured to acquire the respective value of each of the first elementary counters 36 of said set. The comparison module 28 is then configured to compare the respective values of the first elementary counters 36 with respective first elementary thresholds. The generation module 29 is configured to generate a warning signal in the event of detection of abnormal behavior of the monitored software application 14, corresponding to at least one of the first counters 36 with a value lower than the respective first elementary threshold during the predefined time period T.

When a first counter 23 comprises several first elementary counters 36, the skilled person in the art will understand that said first counter 23 is, in other words, subdivided into first elementary counters 36. These first elementary counters 36 then make it possible to obtain more relevant information on the type, or even the nature, of the service(s) called by the monitored software application 14 and then to perform more relevant monitoring of said software application 14.

Each respective first elementary counter 36 is incremented, preferably by one unit, upon each successful call 25. When the first elementary counter 36 is incremented by one unit upon each successful call 25, the corresponding first elementary threshold is preferably equal to 1.

Each type of call is, for example, chosen from the group consisting of: a call to an input/output acquisition service, a call to a process management service, a call to a communication protocol management service, a call to a service for managing a memory area, such as a service for updating said memory area, in particular a rights management service for updating said memory area, such as a flash memory.

As an optional addition or as a variant, at least a second counter 24 comprises a set of second elementary counters 38, each second elementary counter 38 being associated with a type of failure, a single second elementary counter 38 of said set being incremented upon each failed call 26. The acquisition module 22 is then configured to acquire the respective value of each of the second elementary counters 38 of said set. The comparison module 28 is configured to compare the respective values of the second elementary counters 38 with respective second elementary thresholds. The generation module 29 is configured to generate the warning signal in the event of detection of abnormal behavior of the monitored software application 14, corresponding to at least one of the second elementary counters 38 with a value greater than the respective second elementary threshold.

When at least a second counter 24 comprises several second elementary counters 38, the skilled person in the art will also understand that said second counter 24 is, in other words, subdivided into second elementary counters 38. These second elementary counters 38 make it possible to perform a better diagnosis by knowing more precisely what type of failure is at the origin of the detected abnormal behavior.

Each type of failure is, for example, chosen from the group consisting of: a failure resulting from an incorrect call format, a failure resulting from a hardware problem, a failure resulting from a service call causing an unauthorized memory access, or a failure resulting from an unauthorized service call.

Each respective second elementary counter 38 is incremented, preferably by one unit, upon each failed call 26. When the second elementary counter 38 is incremented by one unit upon each failed call 26, the corresponding second elementary threshold is preferably equal to 0.

In the example of FIG. 2, the calls 25, 26 sent by a respective software application 14 to the operating system 18 are denoted $C_{i,j}$ where i is an index corresponding to the software application 14 respectively A1, and j is a number of the call from among the various calls sent by said respective software application 14. By way of example, the calls sent by the first software application A1 are then denoted respectively $C_{1,1}$, $C_{1,2}$, $C_{1,3}$, $C_{1,4}$ and $C_{1,5}$ in the example of FIG. 2. Similarly, in the example of FIG. 2, the calls to the operating system 18 sent by the second software application A2 are denoted $C_{2,1}$, $C_{2,2}$, $C_{2,3}$, $C_{2,4}$ and $C_{2,5}$, and the calls issued by the third software application A3 are denoted $C_{3,1}$, $C_{3,2}$ et $C_{3,3}$.

In the example of FIG. 2, successful calls 25 are conventionally shown as a white lightning bolt, and failed calls 26 are shown as black lightning, or filled in lightning.

In this example of FIG. 2, each first counter 23 associated with the software application A1 is denoted $O_i$, and each second counter 24 associated with said software application A1 is denoted $N_1$.

When a respective first counter 23 comprises a set of first elementary counters 36, each first elementary counter 36 is denoted $O_{i,k}$ in the example of FIG. 2, where i is the index associated with the application Ai, and k is a number of the respective first elementary counter 36 within said set. Similarly, when a respective second counter 24 comprises a set of second elementary counters 38, each second elementary counter 38 is denoted $N_{i,m}$ in the example of FIG. 2 where i is the index associated with the application Ai, and m is a number of the respective second elementary counter 38 within said set.

In the example of FIG. 2, two first elementary counters $O_{1,1}$ and $O_{1,2}$, and a second counter $N_1$ are then associated with the first software application A1, and incremented within the first partition P1 of the operating system 18. In this example, the calls denoted $C_{1,1}$ and $C_{1,2}$ thus cause successive incrementations of the first elementary counter $O_{1,1}$, the calls $C_{1,3}$ and $C_{1,4}$ having resulted in successive incrementations of the second elementary counter $O_{1,2}$, and finally the $C_{1,5}$ failed call resulting in the incrementation of the second counter $N_1$.

In this example of FIG. 2, with the second software application A2 are associated a first counter 23 denoted $O_2$, and two second elementary counters 38, denoted respectively $N_{2,1}$ and $N_{2,2}$, these counters being incremented in the second partition P2 of the operating system 18. The successful calls 25 by the second software application A2, denoted $C_{2,1}$, $C_{2,2}$ and $C_{2,3}$, thus cause successive increments of the first counter $O_2$, and the two failed calls 26, denoted $C_{2,4}$ and $C_{2,5}$, respectively, cause the incrementation of the second elementary counter $N_{2,1}$, and respectively the second elementary counter $N_{2,2}$.

For the third software application A3, three first elementary counters 36, respectively denoted $O_{3,1}$, $O_{3,2}$ and $O_{3,3}$, as well as a second counter 24, denoted $N_3$, are provided in the third partition P3 of the operating system 18. In the example of FIG. 2, all the calls made by the third software application A3 are successful calls 25, the successful call $C_{3,1}$ leading to the incrementation of the first elementary counter $O_{3,1}$, the following call $C_{3,2}$ leading to that of the first elementary counter $O_{3,2}$, and the next call $C_{3,3}$ leading to that of the first elementary counter $O_{3,3}$.

The implementation of the first and second counters 23, 24, as an optional addition to the first elementary counters 36 and/or of the second elementary counters 38, is, for example, carried out by allocating respective memory areas to said counters in each partition P1, P2, P3, and by making these memory areas readable by the acquisition module 22.

The skilled person in the art will further understand that the operating system 18 also comprises processing software in the call tree of the operating system 18 making it possible to implement each corresponding counter in the event of a successful call 25, or respectively in the event of a failed call 26.

The skilled person in the art will also understand that the operating system 18 is able to determine whether the call sent by the monitored software application 14 is a successful call 25, and will then increment the corresponding first counter 23; or if this call is a failed call 26, will then increment the corresponding second counter 24.

Figure 3:
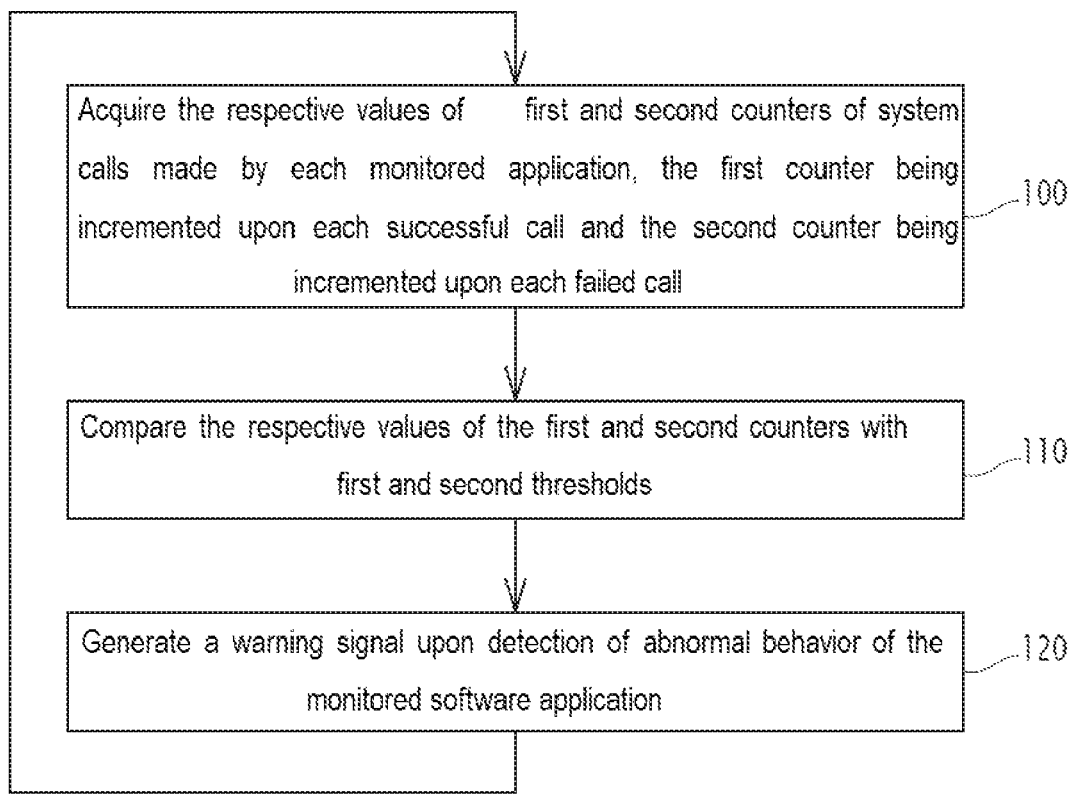
FIG. 3 is a flowchart of a method, according to the invention, for monitoring an avionics software application capable of being executed on the platform, the method being implemented by the monitoring device of FIGS. 1 and 2.

The operation of the avionics system 10 according to the invention, and, in particular, of the electronic monitoring device 20, will now be explained with the aid of FIG. 3 showing a flowchart of a method, according to the invention, of monitoring a respective avionics software application 14, able to be executed on the platform 16 hosting the operating system 18.

During an initial step 100, the monitoring device 20 acquires, via its acquisition module 22, the respective values of the first and second counters 23, 24 for each monitored software application 14.

When, as an optional addition, the first counter 23 comprises several elementary counters 36 and/or the second counter 24 comprises several second elementary counters 38, the acquisition module 22 then acquires the respective value of each of the first elementary counters 36 of said set and/or acquires the respective value of each of the second elementary counters 38 of said set.

The monitoring device 20 then goes to the next step 110 during which it compares, via its comparison module 28 and with the respective first and second thresholds S1, S2, the respective values of the first and second counters 23, 24, acquired during the previous step 100 by the acquisition module 22 and for each monitored software application 14.

When, as an optional addition, the first counter 23 comprises several first elementary counters 36 and/or the second counter 24 comprises several second elementary counters 38, the comparison module 28 compares the respective values of the first elementary counters 36 with respective first elementary thresholds and/or the respective values of the second elementary counters 38 with respective second elementary thresholds.

The monitoring device 20 then generates, during the following step 120 and via its generation module 29, a warning signal in the event of detection of abnormal behavior of the monitored software application 14, this abnormal behavior corresponding to the case where the first counter 23 has a value lower than the first threshold S1 during the predefined time period T and/or in the case where the second counter 24 has a value greater than the second threshold S2.

When, as an optional addition, the first counter 23 comprises several first elementary counters 36 and/or the second counter 24 comprises several second elementary counters 38, the generation module 29 detects abnormal behavior of the monitored software application 14 if at least one of the first elementary counters has a value lower than the respective first elementary threshold during the predefined time period T and/or if at least another of the second elementary counters 38 has a value greater than the respective second elementary threshold.

At the end of step 120, the monitoring device 20 returns to the initial step 100 in order to acquire new respective values of the first and second counters 23, 24 for each monitored software application 14. Since the predefined acquisition frequency is preferably greater than 2 Hz, more preferably substantially between 10 Hz and 20 Hz, the skilled person in the art will then understand that the steps 100, 110, 120 are carried out during a period d execution with a duration of less than 500 ms, more preferably with a duration of between 50 ms and 100 ms.

Thus, the monitoring device 20 according to the invention makes it possible to monitor, efficiently and with a low impact in terms of real time, the avionics software applications 14 via the first and second counters 23, 24.

When, as an optional addition, at least one respective first counter 23 is subdivided into first elementary counters 36, the monitoring device 20 then also makes it possible to provide more precise information on the nature of the services called and on the number of calls to these services.

When, as an optional addition, at least a respective second counter 24 is subdivided into second elementary counters 38, the monitoring device 20 then makes it possible to provide a better diagnosis as to the abnormal behavior detected, each respective second elementary counter 38 then corresponding to a respective failure, for example a failure resulting from an incorrect call format, a failure resulting from a hardware problem, a failure resulting from a service call causing an unauthorized memory access, or a failure resulting from an unauthorized service call.

It may thus be seen that the monitoring device 20 according to the invention and the associated monitoring method make it possible to more effectively detect an attack targeting the monitored software application(s) 14, or abnormal behavior of the monitored software application(s) 14.

The invention claimed is:

1. An electronic monitoring device for monitoring at least one avionics software application capable of being executed on a platform hosting an operating system, the operating system including services, the platform being intended to be carried on board an aircraft, the electronic monitoring device comprising:

an acquisition module configured to acquire a first value of a first counter and a second value of a second counter for each of the at least one monitored avionics software application, the first counter and the second counter each being a counter of calls sent by the at least one monitored avionics software application to one or more of the services of the operating system, the first counter being incremented upon each successful call to one of the services of the operating system and the second counter being incremented upon each failed call;

a comparison module configured to compare the first value with a first threshold and the second value with a second threshold; and a generation module configured to generate a warning signal in an event of detection of abnormal behavior of the at least one monitored avionics software application, corresponding to the first value lower than the first threshold during a predefined time period and/or to the second value greater than the second threshold.

2. The electronic monitoring device according to claim 1, wherein the first counter comprises a set of first elementary counters, each first elementary counter being associated with a type of call sent by the at least one monitored avionics software application to the operating system, a single first elementary counter of said set being incremented upon each successful call, and wherein the acquisition module is configured to acquire a respective value of each of the first elementary counters of said set; the comparison module being configured to compare the respective values of the first elementary counters with respective first elementary thresholds; and the generation module is configured to generate the warning signal in the event of detection of abnormal behavior of the at least one monitored avionics software application, corresponding to the value of the at least one of the first elementary counters below the respective first elementary threshold during the predefined time period.

3. The electronic monitoring device according to claim 2, wherein each type of call is selected from the group consisting of: a call to an input/output acquisition service of the operating system, a call to a process management service of the operating system, a call to a communication protocol management service of the operating system, and a management of a timer.

4. The electronic monitoring device according to claim 1, wherein the second counter comprises a set of second elementary counters, each second elementary counter being associated with a type of failure, a single second elementary counter of said set being incremented upon each failed call, and wherein the acquisition module is configured to acquire a respective value of each of the second elementary counters of said set; the comparison module being configured to compare the respective values of the second elementary counters with respective second elementary thresholds; and the generation module is configured to generate the warning signal in the event of detection of abnormal behavior of the at least one monitored avionics software application, corresponding to the value of the at least one of the second elementary counters greater than the respective second elementary threshold.

5. The electronic monitoring device according to claim 4, wherein each type of failure is selected from the group consisting of: a failure resulting from an incorrect call format, a failure resulting from a hardware problem, a failure resulting from a call to a service of the operating system causing an unauthorized memory access and a failure resulting from an unauthorized call to one of the services of the operating system.

6. The electronic monitoring device according to claim 1, wherein the acquisition module is configured to regularly acquire the respective values of the first and second counters for each of the at least one monitored avionics software application.

7. The electronic monitoring device according to claim 6, wherein the acquisition module is configured to acquire at a predefined acquisition frequency the first value and the second value.

8. The electronic monitoring device according to claim 7, wherein the predefined acquisition frequency is greater than 2 Hz.

9. The electronic monitoring device according to claim 1, wherein the predefined time period is between 100 ms and 500 ms.

10. The electronic monitoring device according to claim 1 implemented in an avionics system comprising:
- a memory capable of storing each of the at least one monitored avionics software application; and
- a processor capable of executing each of the at least one monitored avionics software application.

11. A monitoring method for monitoring at least one avionics software application capable of being executed on a platform hosting an operating system, the operating system including services, the platform being intended to be carried on board an aircraft,
- the monitoring method being implemented by an electronic monitoring device and comprising:
- acquire a first value of a first counter and a second value of a second counter for each of the at least one monitored avionics software application, the first counter and the second counter each being a counter of calls sent by the at least one monitored avionics software application to one or more of the services of the operating system, the first counter being incremented upon each successful call to one of the services of the operating system and the second counter being incremented upon each failed call;
- compare the first value with a first threshold and the second value with a second threshold; and
- generate a warning signal in an event of detection of abnormal behavior of the at least one monitored avionics software application, corresponding to the first value lower than the first threshold during a predefined time period and/or to the second value greater than the second threshold.

12. A non-transitory computer-readable medium including a computer program comprising software instructions which, when executed by a computer, implement the monitoring method according to claim 11.

* * * * *

UNITED STATES PATENT AND TRADEMARK OFFICE
CERTIFICATE OF CORRECTION

| | | |
|---|---|---|
| PATENT NO. | : 11,874,923 B2 | Page 1 of 1 |
| APPLICATION NO. | : 17/089528 | |
| DATED | : January 16, 2024 | |
| INVENTOR(S) | : Stephane Jean-Mary Monnier | |

It is certified that error appears in the above-identified patent and that said Letters Patent is hereby corrected as shown below:

On the Title Page

The Assignee reads:
(73) Assignee: THALES, Courvevoie (FR)
Should read:
(73) Assignee: THALES, Courbevoie (FR)

Signed and Sealed this
Thirtieth Day of April, 2024

Katherine Kelly Vidal
*Director of the United States Patent and Trademark Office*